(12) United States Patent
Dessirier et al.

(10) Patent No.: US 8,507,128 B2
(45) Date of Patent: Aug. 13, 2013

(54) METHOD FOR DISMANTLING DEVICE COMPRISING AT LEAST ONE ARTICLE EMBEDDED AT LEAST PARTIALLY IN RESIN

(75) Inventors: Bruno Dessirier, St Germain en Laye (FR); Fabien Guerin, Chatillon (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 248 days.

(21) Appl. No.: 12/811,469

(22) PCT Filed: Dec. 10, 2008

(86) PCT No.: PCT/FR2008/052270
§ 371 (c)(1), (2), (4) Date: Sep. 22, 2010

(87) PCT Pub. No.: WO2009/087323
PCT Pub. Date: Jul. 16, 2009

(65) Prior Publication Data
US 2011/0045342 A1 Feb. 24, 2011

(30) Foreign Application Priority Data
Jan. 4, 2008 (FR) ...................................... 08 50042

(51) Int. Cl.
*H01M 2/00* (2006.01)
*H01M 2/08* (2006.01)
*H01M 6/08* (2006.01)

(52) U.S. Cl.
USPC ............................ 429/163; 429/164; 429/175

(58) Field of Classification Search
USPC .......................................... 429/163, 164, 175
See application file for complete search history.

(56) References Cited

U.S. PATENT DOCUMENTS

| | | | |
|---|---|---|---|
| 2,949,182 A | 8/1960 | Williams | |
| 3,894,888 A * | 7/1975 | Gold | 429/110 |
| 2004/0136170 A1 | 7/2004 | Tsunezaki et al. | |
| 2006/0275656 A1 * | 12/2006 | Feddrix et al. | 429/179 |

FOREIGN PATENT DOCUMENTS

| | | |
|---|---|---|
| DE | 79 31 680 U1 | 4/1980 |
| JP | 64 029871 U | 2/1989 |
| JP | 2000 182894 A | 6/2000 |

* cited by examiner

*Primary Examiner* — Patrick Ryan
*Assistant Examiner* — Julian Anthony
(74) *Attorney, Agent, or Firm* — Berenato & White, LLC

(57) ABSTRACT

A method for dismantling a device including at least one article at least partially embedded in a resin, the article including a body and a housing at least partially surrounding the body, the housing being at least partially in contact with the resin, wherein the method includes extracting the body from the housing, the housing remaining attached to the resin upon the extraction of the body.

17 Claims, 3 Drawing Sheets

METHOD FOR DISMANTLING DEVICE COMPRISING AT LEAST ONE ARTICLE EMBEDDED AT LEAST PARTIALLY IN RESIN

FIELD OF THE INVENTION

The invention relates in particular to a method for dismantling a device comprising at least one article which is embedded partially in a resin, as well as a device of this type which is designed to equip a motor vehicle.

BACKGROUND OF THE INVENTION

The need exists in the field of motor vehicles for energy storage devices which can be charged during phases of recuperative braking, and discharged during phases of acceleration and starting of the vehicle. Energy storage cells of the super-capacitor or EDLC type (Electrochemical Double Layer Capacitor) are particularly well-suited for motor vehicles in the production of these storage devices.

These cells can be arranged in a vessel, whilst being partially embedded in a heat-conducting resin, thus permitting efficient dissipation of heat. This resin is also used to retain cells in the vessel by means of adhesion.

At the end of the service life of the energy storage device, the different elements of the device are dismantled for the purpose of processing of the waste and/or recycling of some of these elements.

SUMMARY OF THE INVENTION

The object of the invention is to respond better to environmental considerations, in particular by facilitating dismantling at the end of the service life of devices of the above-described type.

The objective of the invention is thus a method for dismantling a device comprising at least one article which is embedded at least partially in a resin, the article comprising a body and an envelope which envelopes the body at least partially, the envelope being at least partially in contact with the resin, the method comprising the step consisting of extracting the body from the envelope, the envelope remaining attached to the resin during the extraction of the body.

By means of the invention, the body of the article which is embedded partially in the resin can be removed easily, since the interface of adhesion between the body and the resin can be reduced, as a result of the presence of the envelope, which remains attached to the resin.

Thus, the operation of dismantling the device at the end of the service life can be facilitated.

In addition, the method according to the invention can take advantage of the presence on certain EDLC cells which exist on the market, of a film which envelopes each cell.

In other words, the method according to the invention can advantageously be applied to existing cells, without modifying them.

In one example of implementation of the invention, the method comprises the step consisting of making a cut in the envelope before the body is extracted from the envelope.

This makes it possible to separate the body from the envelope easily.

The cut in the envelope can advantageously be made according to at least one prefabricated line of weakening of the envelope.

The cut in the envelope can be made by separating a strip which is connected to the remainder of the envelope by prefabricated lines of weakening.

According to one embodiment of the invention, the device comprises a vessel and a cover, the article being received in the vessel, and the envelope of the article comprises at least one portion which is integral with the cover, in particular by adhesion, for example by means of a glue.

If required, the envelope can be cut by removing the cover from the vessel.

According to another embodiment of the invention, the cut in the envelope is made by means of a cutting tool such as a blade.

If applicable, the envelope is damaged, in particular by being torn, only during the extraction of the body from the envelope. This can make it possible to avoid a prior cutting operation.

The object of the invention is also a device, in particular for storage of energy, which in particular is designed to be installed on a vehicle, comprising:
  a resin, in particular a heat-conducting resin; and
  an article, in particular an energy storage cell, comprising a body and an envelope which envelops the body at least partially, the envelope being at least partially in contact with the resin, and comprising at least one mechanical line of weakening which extends outside the resin.

According to one embodiment of the invention, the line of weakening comprises a succession of perforations in the envelope.

If applicable, the envelope comprises two parallel lines of weakening, which in particular extend along the entire length of the article.

In particular, these lines define a strip of the envelope to be removed before the body is extracted from the envelope.

According to another embodiment of the invention, the line of weakening comprises a thread which is arranged such that, when the thread is pulled, this gives rise to cutting of the envelope.

By means of the invention, the prior cutting of the envelope can be carried out particularly simply, without needing an additional tool.

The body of the article can have a substantially cylindrical form, with two substantially flat and parallel lateral surfaces, and the envelope extends at least partially on at least one of the surfaces.

By covering the lateral surfaces as far as possible by the envelope, it is possible to reduce the contact between the body and the resin, which makes it possible to facilitate further the removal of the body.

Preferably, the envelope extends around the entire periphery of the body.

According to one embodiment of the invention, the envelope comprises a plastic film, and in particular a heat-shrink plastic film.

The film is for example made of PVC.

According to one embodiment of the invention, the device comprises a vessel and a cover, the article being received in the vessel, and the envelope of the article comprises at least one portion which is integral with the cover, in particular by adhesion.

The energy storage cell can comprise a super-capacitor, or, as a variant, a Li-On (lithium-ion), Ni-Mh (nickel metal hydride) or lead battery.

The cell can comprise a battery element.

It will be appreciated that the invention can apply to an article other than an energy storage cell. The article can for example be a mechanical or electronic component which is enveloped in a plastic film, and is partially embedded in the resin. The article is for example an electrical connection element between the device and the exterior.

If applicable, the article can be a component which requires a specific treatment circuit, of the type comprising a harmful product.

The object of the invention is also an energy storage device which is designed to be incorporated in a motor vehicle, comprising at least one energy storage cell which is received in a vessel, and is embedded partially in a resin, the cell comprising an insulating envelope.

BRIEF DESCRIPTION OF THE DRAWING

The invention will be able to be better understood by reading the following detailed description of non-limiting embodiments of the invention, and by examining the attached drawing, in which.

DETAILED DESCRIPTION

Figure 1:
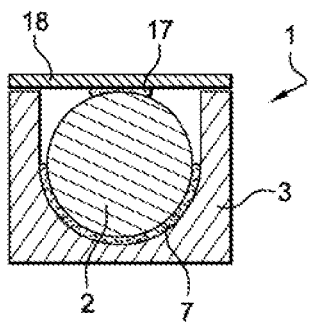
FIG. 1 represents schematically and partially, in transverse cross-section, an energy storage device according to an embodiment of the invention.

FIG. 1 shows an energy storage device 1 of an alternator-starter micro-hybrid system, not represented, for a motor vehicle.

If applicable, the micro-hybrid system can comprise a recuperative braking system.

The device 1 comprises a plurality of energy storage cells 2, of which there are ten in the example described, disposed in a vessel 3 which for example is made of aluminium.

These cells 2 are disposed in a horizontal position, and are connected in series by connection bars, not represented.

Each cell 2 comprises a super-capacitor, or EDLC.

Figure 3:
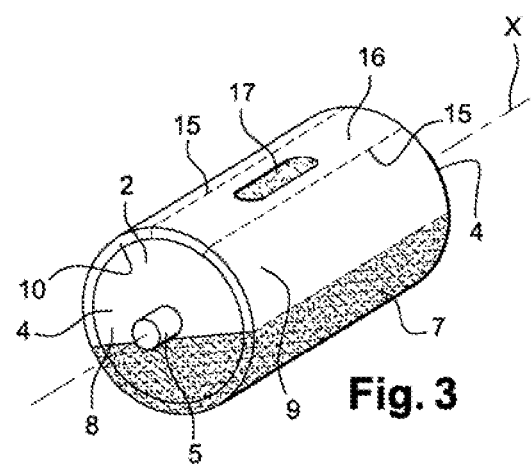
FIG. 3 represents schematically and partially, in perspective, the cell in FIG. 2.

In the example described, each cell 2 has a form which is substantially cylindrical of revolution, with two substantially flat lateral surfaces 4 opposite one another, as illustrated in FIG. 3.

Each cell 2 comprises two connection terminals 5 on the two lateral surfaces.

The cells 2 are partially embedded in a heat-conducting resin 7, for example a polyurethane resin, which makes it possible to dissipate the heat from the cells 2 and retain them in the vessel 3.

This resin 7 can be selected for its suitability for being recycled.

The height of the resin 7 in the vessel 3 is selected, in the example described, such that the cells 2 are embedded up to approximately half their height, just below the terminals 5, as can be seen in FIG. 3.

Figure 2:
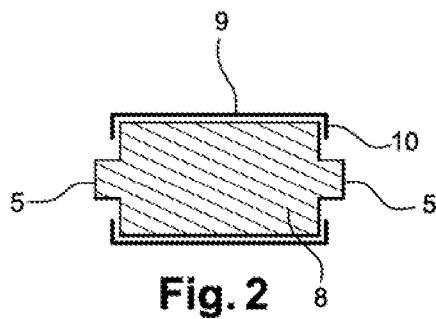
FIG. 2 represents schematically and partially, in longitudinal cross-section, an energy storage cell of the device in figure 1.

Each cell 2 comprises a cylindrical body 8 and an insulating envelope 9 which envelopes this body 8 (in particular see FIGS. 2 and 3).

The envelope 9, which is made of plastic material such as PVC, is in contact with the resin 7, by adhering to the latter.

The envelope 9 extends around the entire periphery of the body 8, and comprises at each longitudinal end an annular shoulder 10 which covers an outer periphery of the lateral surface 4.

Figure 4:
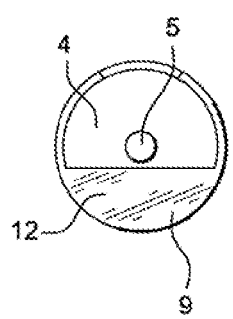
FIG. 4 represents, schematically and partially, in a lateral view, an energy storage cell according to a variant embodiment of the invention.

In a variant illustrated in FIG. 4, the envelope 9 comprises a flat portion 12 which covers a larger part of the lateral surface 4 of the cells 2. For example, this portion 12 of the envelope 9 extends over substantially all of the part of the surface 4 below the terminal 5.

In the example illustrated in FIG. 3, the envelope 9 comprises two prefabricated lines of weakening 15 which extend parallel to a longitudinal axis X of the cell 2, along the entire length of the latter.

The lines of weakening 15 each comprise a succession of perforations which make it possible to detach easily the strip 16 of the envelope 9 which is delimited by these lines 15.

If required, the strip 16 can be separated manually from the remainder of the film 9.

In order to facilitate the dismantling operations at the end of the service life of the cells 2, it is possible to secure the strip 16 to a cover 18 which closes the vessel 3, for example by gluing by means of an adhesive 17.

Thus, when the cover 18 is opened, the strip 16 which is glued to this cover 18 is separated from the remainder of the envelope 9 by tearing the lines of weakening 15.

When several cells 2 must be removed, the fact of gluing the different strips 16 onto the cover 18 advantageously makes it possible to separate these strips 16 simultaneously when the cover 18 is opened.

It is thus possible to avoid carrying out separate operations of cutting of the envelope 9.

The cover 18 is secured to the vessel 3 for example by means of screws, not represented.

Gluing of the envelopes 9 to the underside of the cover 18 can also make it possible to improve the mechanical strength of the cells 2 in the vessel 3.

Figure 5:
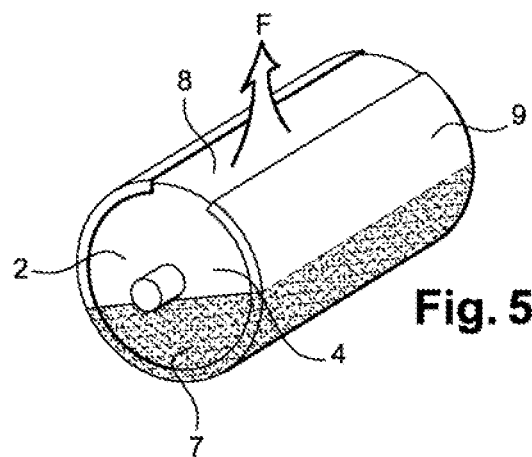
FIG. 5 is a schematic partial view of the cell in FIG. 3, after the envelope has been cut out.
Figure 6:
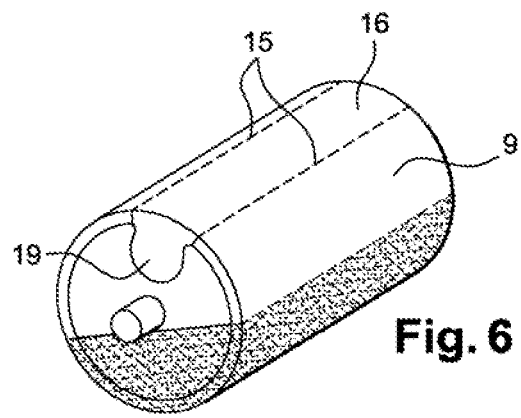
FIGS. 6 to 9 represent, schematically and partially, in perspective, energy storage cells respectively according to several embodiments of the invention.

As can be seen in FIG. 5, after the strip 16 has been removed, the body 8 of the cell 2 can easily be removed from the envelope 9, by applying a force F which is sufficient to separate the body 8 from the envelope 9 and the resin 7.

When the cells 2 are connected to one another by connection bars, it is possible to remove all these cells 2 at the same time, which, if required, makes it possible to avoid having to remove or cut the connection bars in advance.

As a variant, the connection bars are cut or withdrawn before the cells 2 are removed separately.

In order to facilitate the detachment of the strip 16, the latter can be provided with a tongue 19 suitable for being grasped by an operator.

Figure 7:
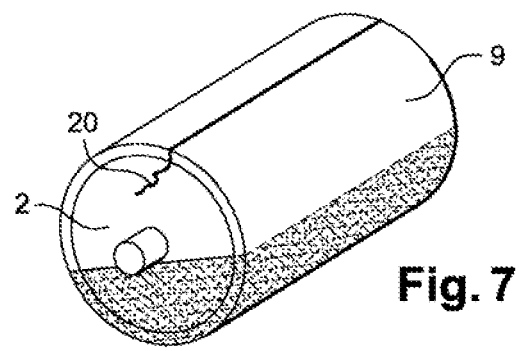

According to another embodiment of the invention which is illustrated in FIG. 7, the envelope 9 can comprise a thread 20 which is arranged such that when this thread 20 is pulled, it is possible to cut the envelope 9.

The line which is travelled by the thread 20 forms a line of weakening according to the invention.

Figure 8:
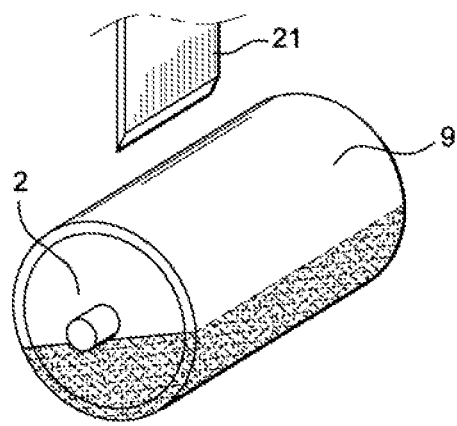

As another variant, as illustrated in FIG. 8, the envelope 9 does not have a prefabricated line of weakening.

In order to extract the cell 2, the envelope 9 is previously cut by means of a cutting tool 21 such as a blade.

Figure 9:
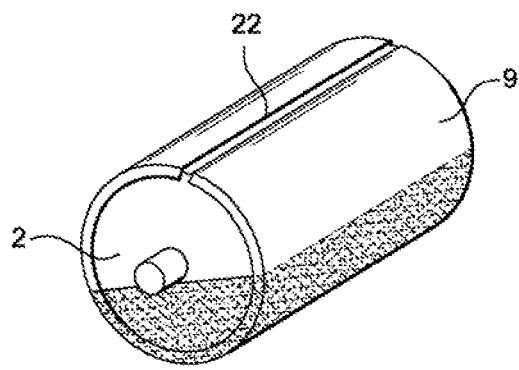

In the example illustrated in FIG. 9, the envelope 9 comprises a line of weakening 22 which is formed by a slot which extends along the entire length of the cell.

It is therefore not necessary to cut the envelope 9 in order to be able to extract the cell 2.

The slot 22 is sufficiently narrow for the envelope 9 to be able to be maintained correctly on the body 8 of the cell 2 before the latter is embedded in the resin 7.

If applicable, one or a plurality of integral bridges can be provided in the slot 22 in order to improve the retention of the envelope 9 around the body 8 of the cell 2.

It will be appreciated that the invention is not limited to the embodiments which have just been described.

For example, the envelope 9 can have a form which is selected such as to cover substantially all of the lateral surfaces 4 of the bodies 8 of the cells 2.

The envelope 9 can be formed by a single film, or, as a variant, by at least two films made of plastic material.

The envelope 9 can be made of an electrically insulating material other than a plastic material.

It can for example consist of paper.

The cell 2 can have a form other than cylindrical of revolution. For example, at least one of the cells 2 can have a polygonal transverse cross-section, such as a hexagonal or rectangular cross-section.

If applicable, the resin 7 can comprise an adhesive.

If required, the resin can comprise additives in order to adapt and improve its thermal and mechanical characteristics, for example, the adhesive effect, the flexibility, the viscosity, etc.

The invention claimed is:

1. A method for dismantling a device (1) comprising at least one article (2) embedded at least partially in a heat-conducting resin (7), the article comprising a body (8) and an envelope (9) encasing the body at least partially, the envelope being at least partially in contact with the resin and separating the body of the article from the resin, the envelope comprising at least one mechanical line of weakening extending outside the resin, the line of weakening (15) comprising one of a succession of perforations in the envelope and a thread (20) arranged such that the action of pulling the thread is cutting the envelope, the method comprising the step of extracting the body from the envelope, the envelope remaining attached to the resin during the extraction of the body from the envelope.

2. The method according to claim 1, wherein the device is an energy storage device and the article is an energy storage cell (2).

3. The method according to claim 1, further comprising the step of making a cut in the envelope (9) before the step of extracting the body from the envelope.

4. The method according to claim 3, wherein the cut in the envelope is made according to at least one prefabricated line of weakening (15) of the envelope (9).

5. The method according to claim 4, wherein the cut in the envelope is made by separating a strip (16) which is connected to the remainder of the envelope by prefabricated lines of weakening (15).

6. The method according to claim 4, wherein the device further comprises a vessel (3) and a cover (18), wherein the article is removably disposed in the vessel so that both the envelope and the vessel are at least partially in contact with the resin, wherein the envelope of the article comprises at least one portion (16) which is integral with the cover, and wherein the envelope is cut by removing the cover from the vessel.

7. The method according to claim 3, wherein the cut in the envelope (9) is made by means of a cutting tool.

8. The method according to claim 1, wherein the envelope is damaged only during the extraction of the body from the envelope.

9. A device (1), comprising:
a heat-conducting resin; and
an article at least partially embedded in the resin and comprising a body and an envelope encasing the body at least partially, the envelope being at least partially in contact with the resin and separating the body of the article from the resin, the envelope comprising at least one mechanical line of weakening extending outside the resin;
a vessel and a cover;
the article being removably disposed in the vessel so that both the envelope and the vessel are at least partially in contact with the resin;
the envelope of the article comprising at least one portion integral with the cover.

10. The device according to claim 9, wherein the envelope comprises two parallel lines of weakening (15), which extend along the entire length of the article.

11. The device according to claim 9, wherein the body has a substantially cylindrical form with two substantially flat and parallel lateral surfaces (4), and wherein the envelope extends at least partially on at least one of the surfaces.

12. The device according to claim 11, wherein the envelope (9) extends around the entire periphery of the body.

13. The device according to claim 9, wherein the envelope comprises a plastic film.

14. The device according to claim 13, wherein the plastic film is a heat-shrink plastic film.

15. The device according to claim 9, wherein the at least one portion is integral with the cover by adhesion.

16. A device, comprising:
a heat-conducting resin; and
an article (2) at least partially embedded in the resin (7) and comprising a body and an envelope at least partially encasing the body;
the envelope being at least partially in contact with the resin and comprising at least one mechanical line of weakening extending outside the resin;
the line of weakening (15) comprising one of a succession of perforations in the envelope and a thread (20) arranged such that the action of pulling the thread is cutting the envelope.

17. An energy storage device, comprising:
a heat-conducting resin; and
an energy storage cell at least partially embedded in a resin (7) and comprising a body and an envelope at least partially encasing the body;
the envelope being at least partially in contact with the resin and comprising at least one mechanical line of weakening extending outside the resin;
the line of weakening comprising one of a succession of perforations in the envelope and a thread (20) arranged such that the action of pulling the thread is cutting the envelope.

* * * * *